July 5, 1949.　　　　　H. T. AVERY　　　　　2,475,121
AIRSCREW
Filed Oct. 9, 1943　　　　　　　　　　　　　7 Sheets-Sheet 1
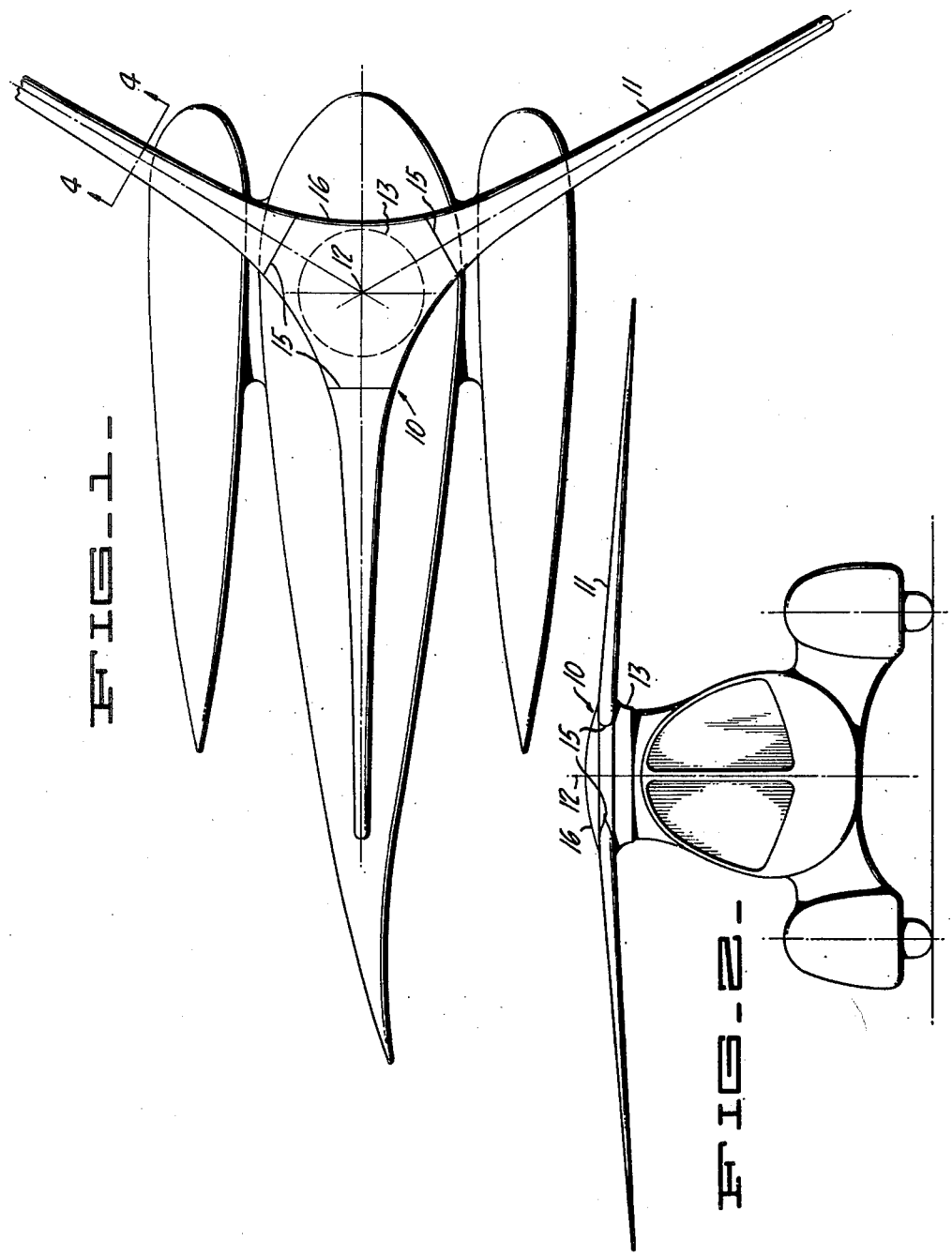
INVENTOR:
Harold T. Avery
BY
ATTORNEYS.

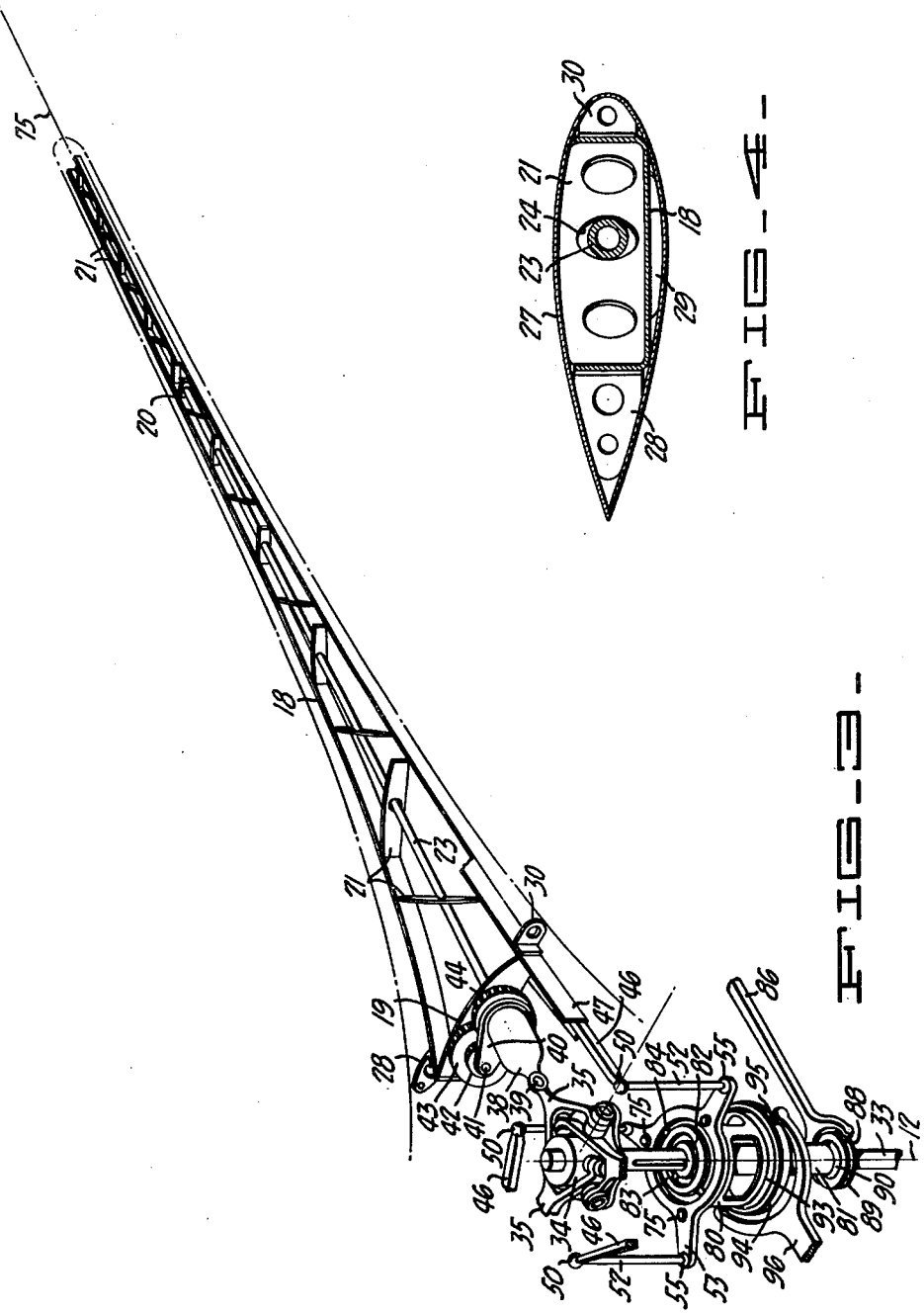

July 5, 1949.　　　　H. T. AVERY　　　　2,475,121
AIRSCREW
Filed Oct. 9, 1943　　　　　　　　　　　　7 Sheets-Sheet 3
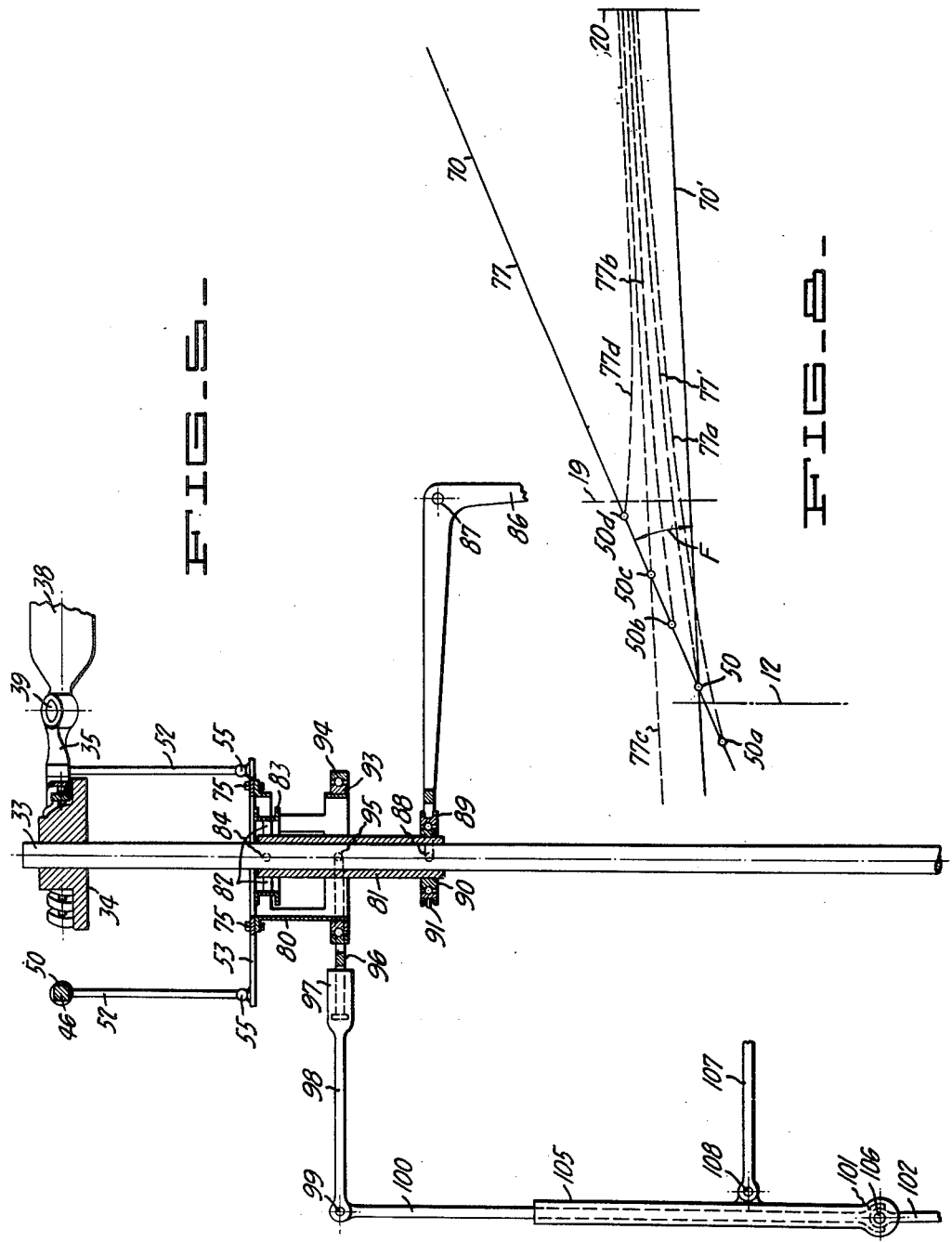
INVENTOR:
Harold T. Avery
BY
ATTORNEYS.

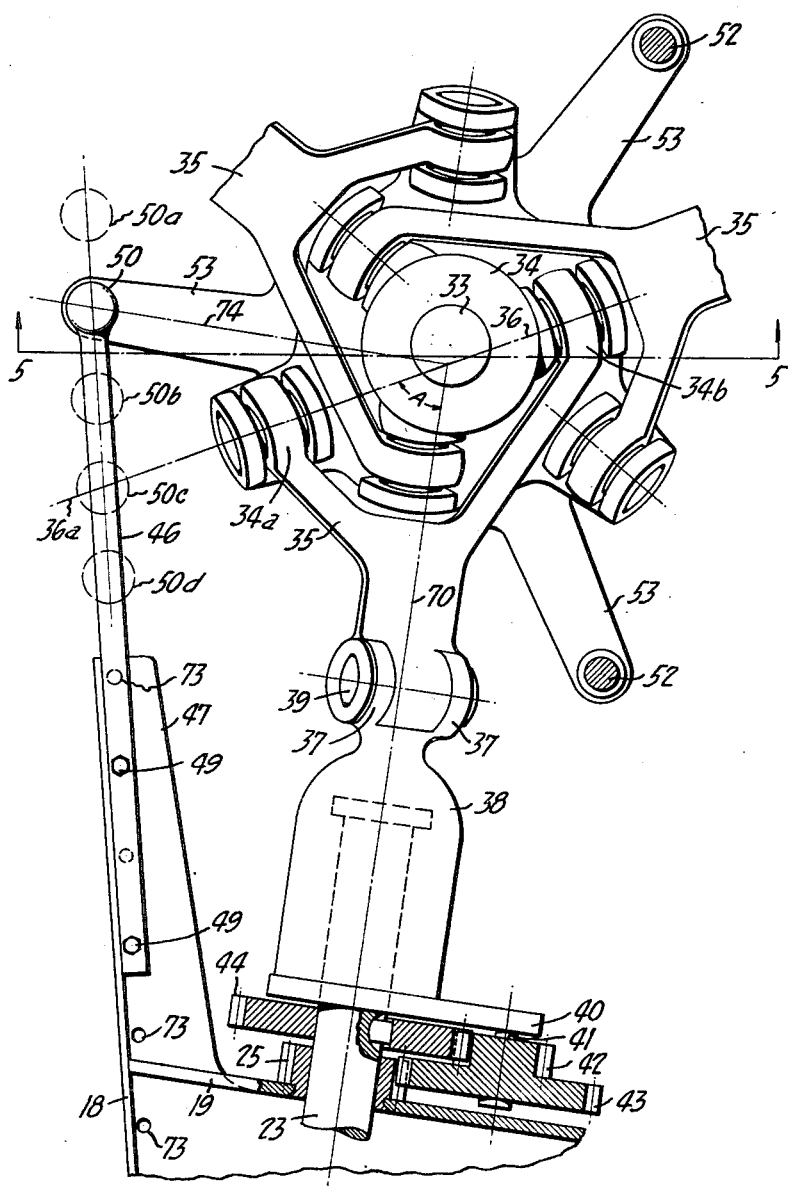
FIG_6_

July 5, 1949.   H. T. AVERY   2,475,121
AIRSCREW
Filed Oct. 9, 1943   7 Sheets-Sheet 6
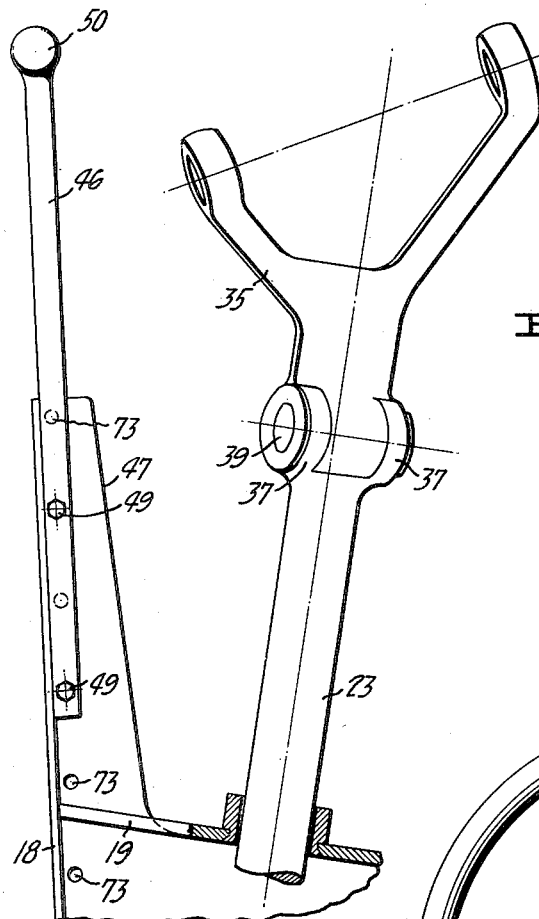
FIG_9_
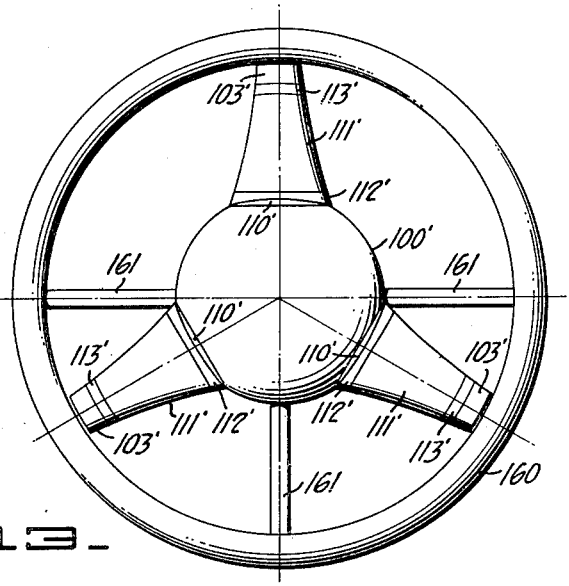
FIG_13_
INVENTOR:
Harold T. Avery
BY *Naylor and Lasagne*
ATTORNEYS.

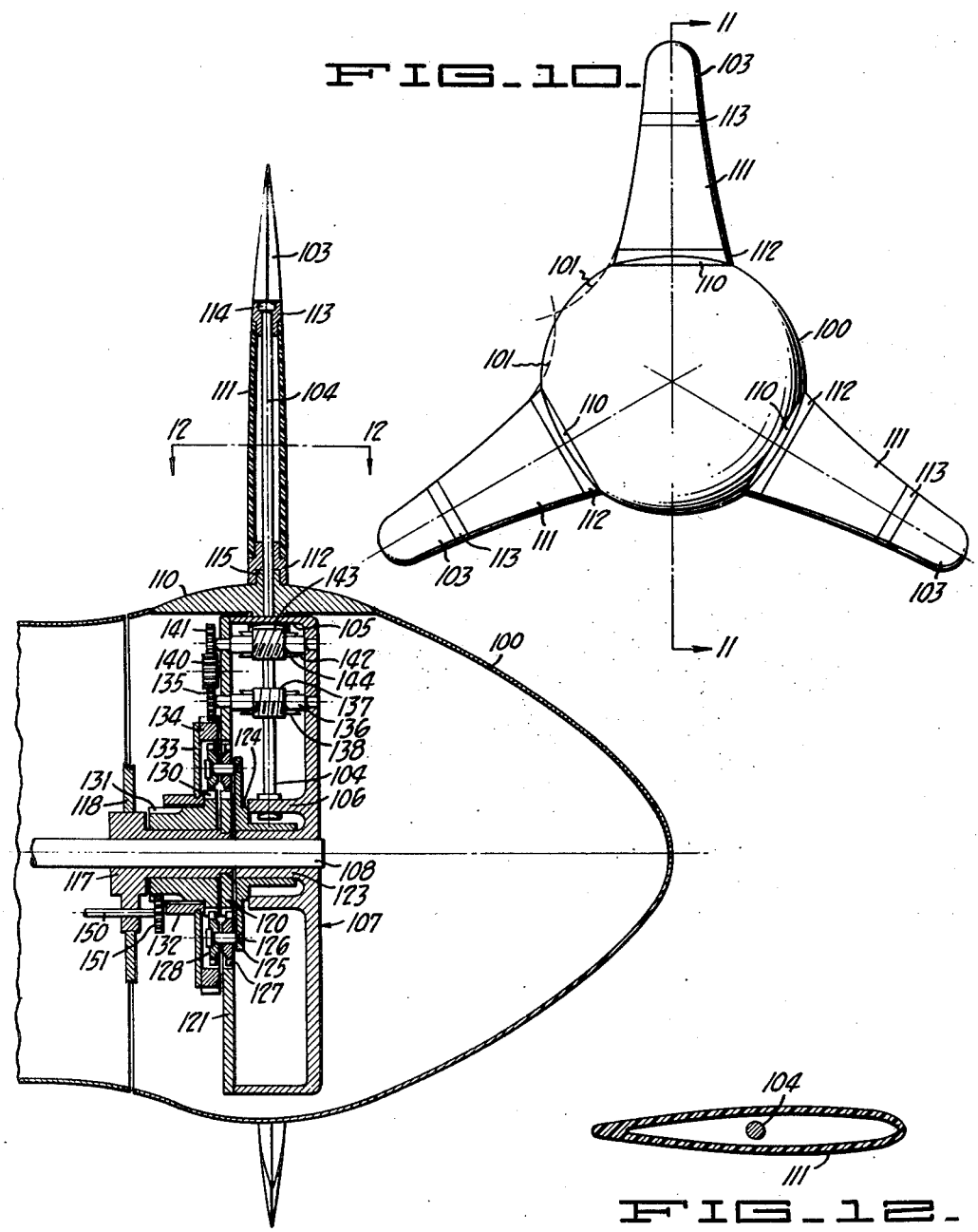

Patented July 5, 1949

2,475,121

UNITED STATES PATENT OFFICE 2,475,121

AIRSCREW

Harold T. Avery, Oakland, Calif.

Application October 9, 1943, Serial No. 505,636

10 Claims. (Cl. 170—160.25)

The present invention relates to the improvement of airscrews for aircraft, and more particularly to the design and/or adjustment of the shape of the airfoil elements thereof for the purpose of enhancing the effectiveness and efficiency of airscrews under widely varying conditions of flight.

Conventional airscrews employed as propellers are designed to attain the maximum efficiency of which they are capable only at approximately the cruising speed of the craft, and they are relatively inefficient under "take-off" conditions where the static-thrust efficiency of the airscrew and its efficiency at low rates of axial advance are controlling. Airscrews employed as sustaining rotors for helicopters or helicogyros operate at all times under conditions in which the static-thrust efficiency of the airscrew and its efficiency at low rates of axial advance are controlling, and therefore when they embody the same characteristics of design which have rendered propelling airscrews inefficient under such conditions of operation the sustaining rotors are similarly inefficient.

I have concluded that this decrease of efficiency under conditions of static-thrust and low rate of axial advance is due, at least in a large part, to radial movements of air in the slip-stream of the airscrew. It is the present practice so to shape the blades of airscrews that the velocity increment imparted to the airstream thereby is largely effected by the outer portion of each blade. It follows that the velocity of different radial portions of the slip-stream is then distinctly unequal and dissipation of energy will necessarily occur by reason of the radial circulation which develops to minimize these inequalities.

At high craft velocities the velocity increment imparted to the air by a propeller is relatively low, and dissipation of energy by such radial circulation in the slip-stream may be negligible. However, under conditions of static thrust and low rate of axial advance the velocity increment imparted to the air by either a propeller or a sustaining rotor is relatively high, and the energy loss arising from such radial circulation in the slip-stream is magnified.

Having in mind the foregoing deficiencies of existing airscrews for aircraft, I have discovered that the efficiency as well as the thrust per unit of airscrew disc area capable of being exerted by any airscrew can be enhanced by a novel combination of shape-and-pitch adjusting means with a preferred form of blade; either the adjusting means or the blade form being capable of producing such results to a minor degree when employed either alone or in conjunction with known blade shapes or pitch adjusting means, respectively, but the two in combination enhancing efficiency and thrust per unit of airscrew disc area to an extent exceeding the sum of the percentages of increase in these figures of merit obtainable by the use of either in conjunction with known blade shapes or pitch adjusting means, respectively.

In general the shape-and-pitch adjusting means of my invention is distinguished by the fact that it is capable of varying the pitch of different portions of each blade by different amounts, respectively, producing a change in the twist of the blade at the same time that the pitch of each portion is changed. This adjusting means is such that when the airscrew is stationary or moving axially with respect to the air it acts to effect a greater change of pitch near the root of the blade than near its tip, and ideally the pattern of this pitch change should be such that the tangent of the pitch angle change at every point along the blade is inversely proportional to the radius of each such point from the axis of the airscrew.

As soon as any lateral movement of the airscrew relative to the air is introduced, as in the forward flight of a helicopter, the desirable pattern of pitch distribution changes, and becomes a function of many factors including the relative rates of axial and lateral movement of the airscrew relative to the air, and of the rotational tip speed of the airscrew blades. The shape-and-pitch adjusting means of my invention is further distinguished by the fact that it is capable of altering the pattern of pitch distribution in conformity with such factors.

While certain advantages can be realized by employing my novel shape-and-pitch adjusting means in conjunction with airscrew blades of conventional shape, I have discovered that the maximum advantage can be realized only by using this means in combination with airscrew blades so proportioned that the blade width varies substantially in inverse ratio to the radius from the axis of the airscrew. Blades proportioned in this manner will have large root portions which I have discovered should be blended into a central core of correspondingly large diameter so as to eliminate from the active airstream that portion of the airscrew area lying too close to center to permit of proportioning the blades substantially in the above mentioned ratio. The prime objectives to be attained or at least approached are: first, the creation of a slip-stream of uniform, axial velocity throughout the active airscrew area; and, second, the maintenance of such uniformity at all pitches of the blades.

When my novel shape-and-pitch adjusting means is employed in conjunction with blades of conventional shape which, as pointed out hereinbefore, do not attain the first of these objectives, the only advantages realized are those arising from the avoidance of the introduction of still further inequalities of slip-stream velocity upon changes of pitch.

When airscrew blades so proportioned that the blade width varies substantially in an inverse ratio to the radius from the axis of the airscrew are employed in conjunction with conventional pitch adjusting means incapable of altering the twist of the blade, the first of the above stated objectives can be attained at only a single pitch setting; because to vary blade pitch and yet retain such a pattern of pitch distribution as will make it possible to produce a slip-stream of uniform axial velocity throughout the airscrew area, requires a greater change of pitch near the root of the blade than near its tip, i. e., a change in the "twist" of the blade.

However, airscrew blades so proportioned that the blade width varies substantially in an inverse ratio to the radius from the axis of the airscrew if employed in conjunction with a specifically correct pitch distribution are capable of attaining the first of the objectives above stated, and when my novel shape-and-pitch adjusting means is employed in combination with such blades, the second of the above stated objectives is also attainable, thus making possible not only a marked increase in maximum airscrew efficiency, but the maintenance of that efficiency over a wide range of operating conditions.

It is therefore a primary object of my invention to provide an airscrew so shaped and proportioned as to more effectively and efficiently produce thrust.

It is, more particularly, an object to provide an airscrew capable of functioning at high efficiency over a wide variety of operating conditions, including particularly conditions involving a low rate of axial advance of the airscrew.

It is a further object to provide superior means for adjusting an airscrew to facilitate efficient performance under such varied conditions.

It is a further object to provide means for automatically altering the patterns of adjustment of an airscrew to better adapt it to various conditions of operation.

It is a further object to provide improved construction for airscrew blades having especial advantages in facilitating the manufacture of blades of the improved shape and characteristics.

It is also an object to provide airscrew hub constructtion both improved mechanically, particularly with regard to the method of mounting and controlling the blades, and improved aerodynamically both in the external shape of the hub unit itself and, particularly in the case of a sustaining rotor, in the shape of its junction with the aircraft fuselage.

More specifically it is an object to provide improved means for changing airscrew blade pitch, including means for altering the pattern of pitch distribution along the blade to best adapt it to different operating conditions.

It is also an object to provide especially simple and effective means for selectively adjusting the pitch of airscrew blades.

Additional objects and advantages of the invention will be apparent in the course of the following description of preferred embodiments thereof which is to be read with reference to the accompanying drawings, in which:

Figure 1 is a plan view of a rotating wing aircraft having a sustaining rotor constructed in accordance with my invention;

Figure 2 is a front elevation of the same craft;

Figure 3 is a perspective view of the framework and pitch adjusting mechanism for one blade of the rotor of the craft illustrated in Figures 1 and 2, and of the mountings and controls for all blades thereof;

Figure 4 is a cross section of a rotor blade taken on line 4—4 of Figure 1;

Figure 5 is a vertical section through the rotor hub, taken substantially on line 5—5 of Figure 6, showing the main rotor drive shaft, and the mechanism for controlling the blades;

Figure 6 is an enlarged plan view of the rotor hub mechanism and the mounting and pitch adjusting mechanism for one blade, shown partly in section;

Figure 8 is a diagrammatic view showing in elevation various possible displaced positions of blade center line and reference lines;

Figure 9 is a plan view similar to Figure 6, but illustrating an alternative blade construction arrangement and showing the mounting arrangement for one blade only;

Figure 10 is a front elevation of a propeller, adapted for airplane propulsion, constructed in accordance with my invention;

Figure 11 is a section through the propeller of Figure 10 taken on line 11—11 of Figure 10, showing particularly the blade construction and blade pitch adjusting means;

Figure 2 is a cross-section of a blade of the propeller of Figure 10 taken on line 12—12 of Figure 11, and Figure 13 is a front elevation of another embodiment of my invention, showing its application to a ducted propeller.

Figure 7:
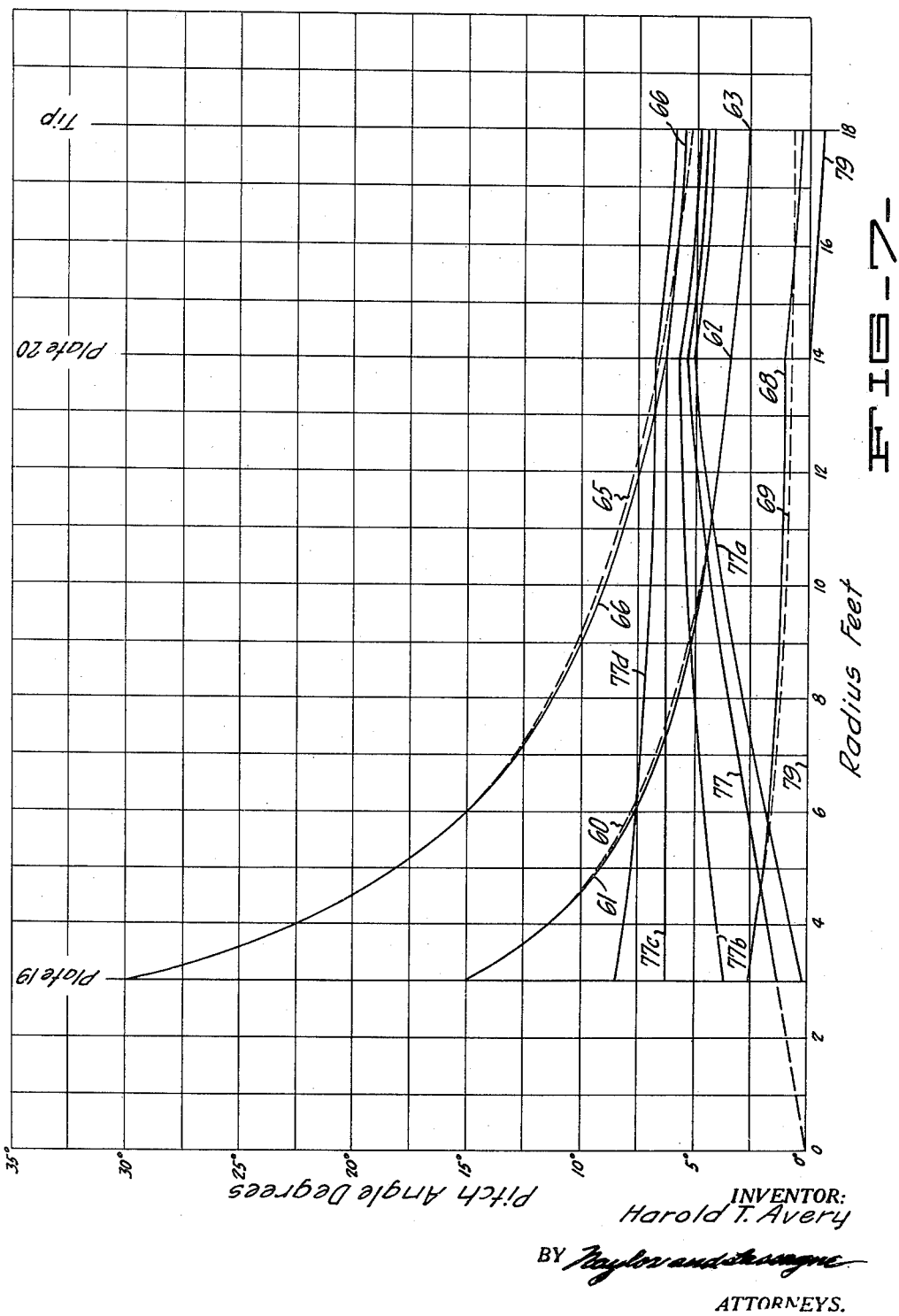
Figure 7 is a diagram showing typical pitch adjustment patterns for a rotor blade constructed in accordance with my invention.

Figure 1 illustrates a helicopter having a sustaining rotor 10 embodying the preferred form of my invention, in accordance with which each blade 11 is so tapered that the blade width varies substantially inversely as the distance from the central axis 12 of the rotor. As illustrated this relationship continues inwardly until the outlines of adjoining blades intersect or coincide with each other. As illustrated also in Figure 2 the rotor is joined to the fuselage by a streamlined enclosure 13 of approximately as large a diameter as can be inscribed within the central solid area formed by the merging of the roots of the blades as illustrated in Figure 1. This central area extending outwardly as far as junction lines 15 on the respective blades is covered with a streamlined covering 16 of material which is highly flexible but stiff enough to reasonably retain its shape, such as, for instance, the rubber and fabric composite material of which the casings for automobile tires are customarily built.

The internal construction of the rotor is illustrated in Figures 3 and 4. The main framework of each blade consists of a channel 18, preferably formed of strip metal, and hence easily constructed to conform to the taper of the blade. Channel 18 is reinforced and stiffened by at least two plates 19 and 20 which extend squarely across the blade and by a plurality of diagonal plates 21, all of which plates are welded or otherwise integrally attached to the channel. Integrally attached to plate 20 and extending inwardly therefrom is a shaft 23, preferably in the shape of a hollow metal tube. Shaft 23 passes freely through apertures in all plates 21 lying between plates 19 and 20. In some of the plates the shaft passes through a clearance hole 24 without touching the plate, while bearings (not shown) may be integral with certain of the plates 21 to pivotally support shaft 23. Shaft 23 is also pivotally supported in plate 19 by a gear 25 integral with plate 19 and serving as a bearing for the shaft as shown in Figure 6.

Since plate 20 is integral with shaft 23, any rocking of plate 19 on shaft 23 will result in a torsional deflection of the portion of channel 18 extending from plate 19 to plate 20. Brace plates 21 are so located throughout this portion of the channel (or otherwise so dimensioned) as to vary the torsional stiffness thereof in accordance with such a prearranged pattern that any given angular displacement of plate 19 relative to plate 20 will cause the intermediate sections of the channel to assume angular displacements arranged in accordance with a prearranged pattern, preferably one in which the amount of angular deflection of the channel within each section thereof is substantially proportional to the difference of the reciprocals of the radii from axis 12 to the two ends of the section. By greater or less spacing of braces 21 the torsional stiffness of the various portions of the channel framework may be altered in any desired manner, so that the arrangement for braces 21 actually adopted will provide a distribution of torsional stiffness varying in accordance with the desired pattern. The outer portion of the channel beyond plate 20 may be arranged to constitute a substantially rigid framework, at least so far as torsional deflection is concerned, because it is relatively unimportant to alter the "twist" of the blade in the portion adjacent to its tip; but between plates 19 and 20 the torsional stiffness is low enough so that considerable angles of twist may readily be introduced.

Plate 19 (Figures 3 and 6) on each blade is preferably located at approximately the vicinity of junction line 15 (Figure 1) at which line the nature of the exterior covering changes. From line 15 out, each blade is covered with an outside covering 27 (Figure 4) adapted to permit the torsional deflection above mentioned, which covering may be of treated fabric or very light sheet metal or a combination of the two. To support this covering 27 in its proper contour, auxiliary framework including brackets 28, 29, and 30 (Figures 3 and 4) may extend integrally out from channel 18.

The method of attachment of the blade to the hub of the rotor and of controlling its pitch is shown in Figure 3, and in greater detail in Figure 6. Integral with the main vertical driving shaft 33 of the rotor is a hub member 34 to which is hinged as at 34a and 34b a link 35 for each blade; the axes of these hinges extending along a flapping hinge line 36, the forward end 36a of which slants upwardly and outwardly. Each link 35 is hinged to a blade root swivel 38 by means of drag hinge 39 perpendicular to the blade axis 70 but inclined about 45° to the vertical. Shaft 23 is locked into swivel 38 by means of a thrust bearing, which however leaves the shaft free to turn in the swivel upon its own axis 70. Integral with swivel 38 is a flange 40 carrying a stud 41 on which is rotatably mounted a compound gear 42, 43. The smaller gear 42 meshes with a gear 44 keyed to the shaft 23, while the larger gear 43 meshes with a gear 25 integral with the plate 19.

As is well known in connection with rotating wing aircraft each blade is positioned about its flapping and drag hinges by the forces acting on the blade, including particularly aerodynamic and centrifugal forces. For each such position of the blade the position of flange 40 is fixed, and therefore the position of stud 41 is fixed relative to shaft 23, but plate 19 is subject to angular displacement on shaft 23 by virtue of controls to be presently described. Through the action of the gear train 25, 43, 42, 44 this will result in shaft 23 being rotated in the same direction as plate 19, but through a smaller angle constituting a fixed proportion of the angle through which plate 19 is rocked. With the gear ratios illustrated in Figure 6 shaft 23 will rock through approximately one-fifth the angle that plate 19 rocks through, but the most desirable ratio of angles in any given embodiment will depend upon a number of factors to be discussed hereinafter.

The effective blade pitch is controlled by rocking plate 19 about shaft 23, this being effected by altering the vertical position of the inner end of a rod 46 integrally attached to an inwardly extending arm 47 of channel 18. Attachment of rod 46 to arm 47 is preferably made by two bolts 49 which extend through holes in rod 46 and may be placed in any of a series of holes 73 in arm 47 to permit alteration of the effective length of the connection for a purpose hereinafter described. The inner end of rod 46 is connected by ball and socket joint 50 to a link 52 which extends up approximately vertically from a swash-plate spider 53, to which it is attached by means of ball and socket joint 55 (Figures 3 and 5). Through means described hereinafter spider 53 may be raised, lowered, or tilted in any direction thus at any instant raising or lowering a given ball and socket joint 50 and thereby altering the angular setting of plate 19 upon shaft 23 as a pivot. Any change of pitch transmitted to plate 19 through the raising or lowering of joint 50 and hence of bar 46 will be proportionately reduced by the gear train 25, 43, 42, 44 and transmitted to shaft 23 in this reduced amount.

Figure 7 shows diagrammatically a number of typical patterns of pitch distribution along a rotor blade. It will be noted that these have been shown as pertaining to a blade 18 feet long, measured from rotor axis, and having plate 19 located 3.0 feet from the axis and plate 20 located 14.0 feet from the axis. What is shown as 0° pitch angle does not necessarily mean a blade angle at which advance in the plane of the rotor disc would produce no lift, but preferably refers to an arbitrary basic angle of blade setting capable of producing lift, somewhat comparable for instance with the usual practice in regard to lift coefficients of air foils for airplane wings. The pitch angles plotted as ordinates then represent angular increases in pitch setting from this basic pitch angle.

When the travel of a helicopter includes a horizontal component of movement relative to the air the pattern of air flow through the rotor becomes relatively complicated, but under all other operating conditions all elements of flow through the rotor disc are essentially axial except for a rotational component of the airflow which in helicopter rotors is so small as to have only a negligible effect on blade pitch. Therefore when, in accordance with the teaching of my invention, substantially uniform axial flow over the entire disc is attained, a particularly simple flow pattern results; the angle of air movement relative to the blade being, at each radius, substantially the angle whose tangent is the axial velocity divided by the rotor blade rotational velocity and therefore being such that the tangent of the angle varies inversely with the radius.

In Figure 7 the dotted curve 60 is a typical one following this pattern, wherein the tangents of the angles vary inversely with the radius. The gear train 25, 43, 42, 44 is not adapted to precisely follow this pattern, but is one in which the angles, rather than the tangents of the angles, are proportional. Curve 61 is one in which the angles themselves vary inversely with the radius, and it will be noted that the two curves are so nearly identical that the difference will not substantially affect the result obtained. If, as illustrated, plate 20 is at three-fourteenths the radius of plate 19, and if, as in the case of curves 60 and 61, the pitch angle at plate 19 is 15°00' the pitch angle at plate 20 will be 3°17' on the basis of tangents varying inversely at the radius (curve 60) and will be 3°13' on the basis of angles varying inversely as the radius (curve 61) showing the difference to be very negligible. By slight alteration of the pattern of torsional stiffness the blade may be made to more nearly follow curve 60 than curve 61 for points intermediate between plate 19 and 20. However, the effect of the rotational component, which was stated to be negligible, would be to render desirable a little more than proportional steepening of angle toward the root of the blade, and it is therefore considered desirable to follow the pattern of curve 60, wherein the angles are inversely proportional to the radii, or, in case of a particularly heavy rotor disc loading, a curve slightly more concave than curve 61 together with possibly a slightly higher ratio of gearing down between the movements of plate 19 and plate 20.

Since the arrangement as illustrated in the drawings and previously described does not contemplate introducing any twist into the blade beyond plate 20, the changes of pitch will be substantially constant beyond plate 20. Thus, if that portion of the blade is constructed in accordance with the portion of curve 61 lying between point 62 and point 63, the only type of pitch change that can be made for this portion of the blade will be equivalent to a bodily raising or lowering of this portion of curve 61, and it will be noted that the only other solid line curves in Figure 7 for this portion of the blade accord with this.

If pitch is now to be increased to twice as steep a setting as that of curve 61, dotted line curve 65, Figure 7, results, wherein each angle is exactly twice that of the corresponding angle for curve 61. However, to follow this curve perfectly would require warping of the blade clear out to the outer tip, and while this would be possible the particular embodiment disclosed does not contemplate doing this. Curve 66 illustrates how closely curve 65 may be approximated by an actual adjustment of the blade without warping the outer four feet thereof. It will be noted that the angular displacement of plate 20 is shown as according with that theoretically required for the mid-point of the outer unwarped section, namely for 16 foot radius, instead of being related to that of plate 19 exactly in the inverse ratio of the respective radii to the two plates, meaning that plate 20 is displaced 3/16 instead of 3/14 the amount that plate 19 is displaced. In case of reduction of pitch setting the blade will then, for instance, assume the pattern shown by solid line curve 68, which, it will be observed, coincides very closely with the theoretical curve 69.

The ratio of reduction of angular movement effected by the gear train 25, 43, 42, 44 is not, in general, made equal to the desired ratio of the angular displacements of plates 19 and 20, but will in general be such as to effect a still further gearing down to allow for the torsional deflection of shaft 23 under the loading which produces the desired torsional deflection of the blade structure. The required gear ratio may be determined as follows:

Let $g$=the required ratio of angular displacement of gear 44 to that of gear 25
Let $A_1$=a desired change in pitch angle setting of plate 20
Let $A_2$=corresponding change in pitch angle setting of plate 19
Let $B_1$=corresponding change in angular setting of inner end of shaft 23
Let $r_1$=radius to plate 20
Let $r_2$=radius to plate 19
Let $R$=radius to tip of blade
Let $f_1$=torsional deflection of shaft 23 under unit load, which is inversely proportional to the stiffness of shaft 23
Let $f_2$=torsional deflection of blade frame from plate 19 to plate 20 under same load, which is inversely proportional to the stiffness of this portion of the blade frame.

Since the actual torsional deflections of the blade frame and of shaft 23 at a given blade pitch setting will bear the same ratio to each other as that of the torsional deflections of these two members under unit load $$\frac{A_2 - A_1}{A_1 - B_1} = \frac{f_2}{f_1} \qquad (1)$$

from which $$B_1 = A_1 - \frac{f_1}{f_2}(A_2 - A_1) \qquad (2)$$

From definition of the desired gear ratio $$g = \frac{B_1}{A_2} \qquad (3)$$

From Equations 2 and 3

$$g = \frac{A_1}{A_2} - \frac{f_1}{f_2} \times \frac{A_2 - A_1}{A_2} \qquad (4)$$

From this it will be seen that the gear ratio will be in the ratio of the desired angular displacements of plates 19 and 20 only if the second term disappears, which will be true if $f_1$ equals zero, which would mean using a shaft 23 that is absolutely rigid, or at least has negligible torsional deflection under all operating conditions. With any appreciable torsional deflection of shaft 23 the gear ratio becomes smaller (that is greater gear reduction) than the ratio of the plate deflections.

If the gear train were dispensed with and shaft 23 made integral with rings 37 of hinge 39, as illustrated in Figure 9, it would be equivalent to reducing the gear ratio, $g$, to zero, which could be done and the proper ratio of angular displacement of plates 19 and 20 still maintained if Equation 4 is satisfied with $g=0$, which will be the case if $$\frac{f_2}{f_1}=\frac{A_2-A_1}{A_1}=\frac{A_2}{A_1}-l \quad (5)$$

namely if the torsional stiffness of the shaft and the blade frame are in the ratio of the desired angular displacements. The Figure 9 embodiment should therefore be so constructed that the ratio of stiffness defined by Equation 5 will maintain.

If the angular displacements are inversely proportional to the radii, with the displacement of plate 20 corresponding to that required for a point half way between plate 20 and the tip of the blade, Equation 4 may be rewritten to express the required gear ratio in terms of the radii as follows:

$$g=\frac{2r_2\left(\frac{f_1}{f_2}+l\right)-(r_1+R)\frac{f_1}{f_2}}{r_1+R} \quad (6)$$

and Equation 5 rewritten to express the ratio of torsional stiffness making possible the elimination of the gear reduction as illustrated in Figure 9 as follows:

$$\frac{f_2}{f_1}=\frac{r_1+R}{2r_2}-l \quad (7)$$

As previously noted, it is desirable that the portion of the blade between plate 19 and plate 20 deflect in such a manner that the pitch angles at various distances from center will be substantially inversely proportional to the respective distances. To express this mathematically, Let $A$ equal the pitch angle at any point in this portion of the blade.
Let $r$ equal the distance from rotor center to this point.
Let $I$ equal the effective polar moment of inertia of the blade section at this same point.
Let $k$ equal a constant.

The condition stated above is then:

$$A \text{ equals } \frac{k}{r} \quad (8)$$

The rate of change of pitch angle at various radial distances from rotor center may then be determined by differentiation, as follows:

$$\frac{dA}{dr} \text{ equals} -\frac{k}{r^2} \quad (9)$$

However, from the laws of torsional deflection, we know:

$$\frac{dA}{dr} \text{ equals} -\frac{l}{I} \quad (10)$$

From Equations 9 and 10, it is evident that the effective polar moment of inertia must vary substantially in direct proportion to the square of the radius from rotor center if the blade is to undergo torsional deflections which bring it substantially into accord with curves 61, 65, and 69 (Figure 7). That is:

$$I \sim r^2 \quad (11)$$

Certain of the foregoing equations may be further simplified by letting:

$$A \text{ equals } \frac{A_1}{A_2} \quad (12)$$

and $$f \text{ equals } \frac{f_1}{f_2} \quad (13)$$

"$f$," therefore, represents the ratio of the torsional stiffness of the torsionally deflected portion of the blade frame to that of shaft 23.

Inserting these values in Equations 4, 5, 6, and 7, respectively, we have:

$$g \text{ equals } a-f(l-a) \quad (14)$$

$$f \text{ equals } \frac{a}{l-a} \quad (15)$$

$$g \text{ equals } \frac{2r_2}{r_1+R}(f+l)-f \quad (16)$$

$$f \text{ equals } \frac{r_1+R}{2r_2}-l \quad (17)$$

As a specific illustration of the effect of the stiffness of shaft 23 assume $$r_1=14 \text{ feet}$$
$$r_2=3.0 \text{ feet}$$
$$R=18 \text{ feet}$$

Then if shaft 23 is essentially rigid and $f_1=0$ $g=0.1875$ from Equation 6.

If the shaft is not rigid but is ten times as stiff torsionally as the blade frame, that is $$\frac{f_2}{f_1}=10$$

then $g=0.1062$, requiring almost twice as great a gear reduction as with the rigid shaft.

From Equation 7 we find that to eliminate the gearing and adopt the Figure 9 arrangement it is necessary to establish the stiffness ratio so that:

$$\frac{f_2}{f_1}=4.333$$

For a craft in which the changes of blade pitch angle are not so great that this ratio would result in too limber a blade such an arrangement would constitute a preferred embodiment. For values of $$\frac{f_2}{f_1}$$

less than this, $g$ becomes negative, which means that if for any reason it is desired to utilize a shaft 23 with greater torsional flexibility relative to the torsional flexibility of the blade than that which would give the desired deflection pattern with the gearing eliminated, this may be done providing the gear train is so arranged as to produce a displacement of the root of shaft 23 opposite in direction to that of plate 19, as by interposing an additional idler.

When the advance of the sustaining rotor of a rotating wing aircraft is other than axial, as for instance when it is travelling forward at its normal cruising speed, the velocity and angle of airflow over each blade varies cyclically giving rise to a rather complex pattern of airflow through the rotor, which pattern changes considerably with changes of flight conditions. The determination of a desirable pattern for pitch distribution is therefore not as simple nor capable of as definite and general a solution as in the case of axial flow. It is, however, very clear that the relatively steep pitches, which as outlined above, are desirable near the roots of the blades under certain conditions of axial flow, are no longer desirable at least in comparable degree in case of translational movement. If the direction of rotation of the rotor is such that a blade on the right side rotates toward the rear of the craft (such a blade being known as a "receding" blade when the craft is advancing), and a blade on the left toward the front of the craft (such a blade being known as an "advancing" blade), then in normal flight the rotor will, at any instant, be revolving in space about a point located to the right of the rotor axis and spaced from it by a fraction of the rotor radius corresponding to the tip-speed ratio, namely the ratio of the speed of advance of the craft to the tip rotational velocity, which ratio is usually about one-third, but may become as large as two-thirds.

Therefore the movement of an advancing blade relative to the general body of air is in case of forward flight generally comparable to that of the outer two-thirds or so of a blade under axial flow conditions and the pattern of pitch distribution should preferably accord with that for patterns previously developed for the outer two-thirds or so of the blade, using relatively low effective pitch because of the relatively high velocities, and the desirability of minimizing upward flapping on the advancing side. On the receding side on the other hand, the blade is rotating in space about a point usually lying within the middle third of the blade itself. Therefore, relatively high pitches would be desirable in view of the low air velocities and the desirability of minimizing downward flappng on the receding side, and if possible we should have the pitches steepening toward the middle of the blade, and if possible reversing or at least reducing near the root. It does not seem practicable to approximate very closely the varying type of pattern outlined above but the present invention makes it possible more nearly to do so than with former blade arrangements.

Various arrangements have been utilized in the prior art to decrease pitch on the advancing side and increase it on the receding side. In one arrangement this is accomplished by the angling upward and outward of the forward end of the flapping hinge, with the blade so attached to the hinge that its pitch is altered by its angular displacement about the hinge. In another arrangement the blade is pivotally mounted for angular displacement about its own longitudinal axis and pitch is controlled by a link extending forward from the blade outboard from the flapping hinge to a pivotal control connection thus enabling flapping to produce the same pitch changing effect as if the blade pitch were fixed by a flapping hinge passing through the intersection of the blade axis with the flapping hinge and through the pivotal control connection. By utilizing both of these arrangements and combining them in a novel manner I am able to secure a resulting pattern of pitch change in response to flapping, which not only differs radically from that introduced for controlling vertical movements of the craft so that a type of pattern respectively more favorable for each type of operation may be secured, but which also may be made to vary throughout each flapping cycle, thus introducing the possibility of better adapting it to the various phases of the cycle.

The specific pattern of pitch distribution which the blade will adopt at each given phase of the cycle under any given flight condition depends upon the dimensional relationships of the mechanisms employed for introducing from the two different arrangements mentioned the respective components of pitch change in response to flapping movement. To be more specific the angle A (Figure 6) between the blade axis 70 and the flapping hinge axis 36 determines the amount of angular displacement of pin 41 about blade axis 70, while the location of ball and socket joint 50 determines the angular rock of plate 19 about axis 70 in response to flapping, and these two combine to determine the angular rock of shaft 23. Therefore the relationship of joint 50 to hinge axis 36 and blade axis 70 determines the patterns of pitch distribution effective during flapping cycles.

This relationship may be altered so as to adapt the craft for delivering its best performance under selected flight conditions. In the embodiment disclosed such alteration is not contemplated during flight, but a given craft may be altered to better adapt it to efficient performance under heavier loads, or at higher speeds, or under whatever general type of service it may be desired to favor. Such alterations may be effected by removing bolts 49 and fastening them into other holes 73 of arm 47, whereby joint 50, instead of being located, as illustrated in Figure 6, on a line 74 perpendicular to blade axis 70 at its intersection with hinge axis 36, may be made to occupy a position 50a on the back side of line 74, or a position 50b, intermediate between line 74 and hinge axis 36, or a position 50c on hinge axis 36, or a position 50d outside hinge axis 36, or any other position desired. Preferably bolts 75 (Figures 3 and 5) may be released and utilized to reclamp spider 53 to its mounting at a new rotational position such as to maintain links 52 substantially vertical in each readjusted position of joint 50.

The effect of the location of joint 50 on the pattern of pitch distribution along a blade may be best understood by reference to Figure 8, which shows in elevation various relative positions of certain lines determinative of blade pitch. These lines include rotor axis 12, blade axis 70, and an arbitrary reference line 77 normally parallel to blade axis 70 and fixed in the blade in the vicinity of its leading edge. In Figure 8 blade axis 70 is shown in the position which it occupies when the blade is rocked upward about its flapping hinge sufficiently so that the blade pitch is reduced to zero or to such other basic value as places reference line 77 in such a position that its projection onto the plane containing axes 12 and 70 coincides with blade axis 70. If blade 70 be now rocked downward about its flapping hinge, which in the Figure 8 projection coincides with point 50, into the position 70' reference line 77 will assume a position dependent upon the position of point 50 relative to the hinge lines and axes. If, for instance, joint 50 is located at the position designated 50c in Figures 6 and 8 with spider 53 (Figures 3 and 6) adjusted to such a height as to bring the joint exactly on the flapping hinge line 36, then the blade will rock about line 36 as an axis without any rolling of the gear train 25, 43, 42, 44 and reference line 77 will remain parallel to axis 70 at all times, assuming the position 77c when the blade axis is rocked down to position 70'.

In analyzing other positions of joint 50 it will be assumed for the purpose of the analysis that spider 53 (Figures 3 and 6) is brought in each instance to such an adjustment as will place the projection of joint 50 in Figure 8 exactly on line 70. While this will be a different adjustment of spider 53 in each case it will have the effect of insuring that at the flapping angle represented by line 70 the blade will in each instance have the same basic pitch (nominally zero pitch) and therefore the positions assumed by reference line 77 upon rocking blade axis 70 down to position 70' will be indicative of the difference in effect on blade pitch brought about by rocking the blade through a fixed angle. The location and configuration that reference line 77 will assume for positions of joint 50 displaced from hinge axis 36 (Figure 6) can best be determined by assuming that the blade axis is first rocked from position 70 to position 70' with the gear train 25, 43, 42, 44 locked, and that whatever vertical displacement of joint 50 that this would entail is permitted to take place, which rocking will always bring line 77 to position 77c, and that thereafter the gear train is freed and joint 50 returned to the vertical height it held prior to rocking which means that the vertical displacement which would be necessary to move joint 50 from line 77c to line 70 will produce a pattern for line 77 according exactly with the pattern which would be produced by this same amount of vertical displacement of joint 50 as previously discussed in connection with axial flow conditions and exemplified by curves 68, 61 and 66 of Figure 7. Thus curves 77a, 77' and 77b and 77d of Figures 7 and 8 indicate the patterns assumed by reference line 77 and hence the patterns of pitch angle distribution effective with the blade axis in position 70' and with joint 50 in the positions indicated in Figures 6 and 8 as positions 50a, 50, 50b, and 50d, respectively. The locations of the intersections of these respective curves with lines 19 and 20 in Figure 8 correspond to the respective deflections of plates 19 and 20 in response to the above mentioned vertical displacements of joint 50. It will be noted that a blade with a high flapping angle may have a substantially uniform low angle of lift corresponding to line 79 of Figure 7, while a blade with a low flapping angle may, for the joint position identified as 50 in Figures 6 and 8, have its pitch increased in accordance with curve 77' of Figure 7. On the other hand for flight conditions under which it would be more advantageous for the change of pitch with change of flapping angle to be more uniform throughout the length of the blade, joint 50 may be located at position 50c and the relatively level pitch curve 77c secured (Figures 7 and 8), in which case flapping displacement of a blade through the flapping range represented by angle F, Figure 8, will change pitch from that corresponding to line 79 at the bottom of the chart Figure 7 to that represented by line 77c, being the same amount of change at all radii.

Regardless of the specific location chosen for joint 50 an consequent specific pattern obtained for line 77, if the axial component of relative airflow through the rotor is radically increased, as for instance by giving a considerable tilt to the effective plane of rotation of the rotor combined with considerable forward speed of the craft, this increase of axial flow should be accompanied by a corresponding increase in the relative steepness of pitch toward the roots of the blades, if best efficiency is to be maintained, which relative steepening may be introduced by a raising of spider 53 (Figures 3 and 6). Thus any desired blending of the "axial flow" curves of Figure 7 (such as curves 69, 61 and 66) with the "translational flight" curves (such as 77a, 77', 77b, 77c, and 77d) may be secured, to best suit any particular ratios of translational flight and axial flow velocities that may be encountered. Since introducing any large angles of tilt into the rotor will require some steepening of blade pitch to maintain any given flight angle, and since any further increase in blade pitch than this amount will tend to steepen flight angle and further increase axial flow, it is apparent that the adjustments of spider 53 necessarily incidental to flight control will automatically take care of introducing alterations into the pattern of blade pitch distribution of such a nature as to better adapt the blades to function with various proportions of axial and translational velocities, these alterations being so related to the ratio of axial flow components that increase in the ratio of axial flow components of velocity will cause the patterns of blade pitch distribution to become more like those hereinbefore described as adapted to axial flow conditions, coinciding therewith when the controls are so set as to produce truly axial flow.

A preferred method of controlling the vertical position and tilt of spider 53, so as to thereby control the pitch of the rotor blades both synchronously and cylically, is illustrated in Figures 3 and 5. As there indicated spider 53 is fastened by means of bolts 75 to a floating cylindrical frame 80, which is supported from sleeve 81 by means of a universal or gimbal mounting including two pins 82 extending radially outward from sleeve 81 and forming a pivotal mounting for ring 83, which in turn carries two pins 84 at right angles to pins 82 and forming a pivotal connection between ring 83 and frame 80. Sleeve 81 is splined to shaft 33 and vertically slidable on the shaft. The vertical position of sleeve 81 and hence of frame 80 and spider 53 is controlled through a bell crank 86, pivotally mounted to the frame of the craft at 87 and terminating in a fork including pins 88 which ride freely in an external groove of the outer race 89 of a ball bearing, the inner race 90 of which is integral with sleeve 81. In order to prevent the outer ball race 89 from being continually rotated by the friction of the ball bearing and possibly wearing flats on pins 88 a pin 91 is inserted in the groove of ball race 89, thus limiting rotational displacement of race 89 relative to pins 88. It will be apparent that the angular position of bell crank 86 on its pivot 87 will determine the average height of spider 53 and hence the average effective pitch of the rotor blades.

Tilting of spider 53 about one axis, fixed relative to the craft, will control longitudinal movement of the craft, while tilting about an axis perpendicular thereto will control lateral movement. Arrangements are therefore provided for independently controlling the tilt of frame 80, and hence of spider 53 integrally attached thereto, about two mutually perpendicular axes fixed relative to the craft. For this purpose, as shown in Figures 3 and 5, the inner race 93 of a ball bearing is integrally attached to frame 80 while the outer race 94 thereof is pivotally connected by two pins 95 to a fork 96 which is seated in socket 97 on the end of link 98 so as to be freely rotatable about the longitudinal axis of the link but not otherwise displaceable relative thereto. Link 98 is connected by means of a hinge pin 99 to a rod 100, which in turn is connected by a universal joint 101 to a shaft 102. Rod 100 is surrounded in part by a sleeve 105 pivotally mounted on hinge pins 106, the central axis of which passes through the center of universal joint 101. The angular position of sleeve 105 on pins 106 is controlled by a link 107 pivotally attached to the sleeve at 108, and operated by suitable manual controls (not shown).

Any longitudinal displacement of link 107 will therefore result in displacement of the bottom of frame 80 in the same direction and by a proportional amount, resulting in a rocking of the frame on its universal mounting, and consequent tilting of spider 53, about an axis perpendicular to the plane of Figure 5, while rotation of shaft 102 and consequently of rod 100 will result in displacement of the bottom of frame 80 in a direction substantially perpendicular to that controlled by link 107, and tilting of frame 80 and spider 53 substantially about an axis lying in the plane of Figure 5. Therefore the arrangement is such that the two members 86 and 98 suffice to transmit to spider 53 all control movements including vertical displacement, and tilting about all axes.

The principle of utilizing pitch adjustment of an airscrew involving introduction of twist in accordance with a prearranged pattern, in conjunction with a properly coordinated blade width pattern, may be advantageously employed in airscrews utilized for propulsion, such for instance as airplane propellers. As the range of blade pitch adjustment utilized in flight increases there is a corresponding increase in the sacrifice in efficiency necessarily incident to the usual practice of employing a rigid blade in which the pattern of blade pitch distribution cannot be altered except by imparting identical increases or decreases in pitch to all blade elements. With such a blade the built-in blade twist is at best a compromise, and with increasing range of pitch adjustment a very serious compromise, between the patterns of pitch distribution best suited to different stages of pitch adjustment. The increasing speeds and altitudes frequently encountered in flight is rapidly increasing the seriousness of this problem.

At the same time the increased propeller disc loading, incidental to the use of higher horsepowers per propeller is rapidly requiring increase in propeller solidities, which if carried very far involves serious sacrifice in efficiency unless steps are taken to insure substantially equal axial velocity over the entire active portion of the propeller disc area. As previously described this requires both the adoption of a blade width pattern, in which the width of the active portion of each blade varies substantially in inverse proportion to the radius from the propeller axis, and also the use of a flexible blade with controlled variable twist to permit of suitable alteration of the blade pitch distribution pattern as pitch changes, preferably so that the increments of pitch angle will also vary substantially inversely as the radius from the propeller axis.

Figures 10, 11, and 12 illustrate a propeller embodying these improvements. It will be noted that the central hub shielding 100 is very much larger in diameter than is customary in present propeller practice but that it approximates the lines 101, Figure 10, which represent the theoretical continuation inward of the outer part of the blade outline if the blade were to continue to broaden in inverse ratio to radius. Each blade comprises an outer substantially rigid tip 103 which, as illustrated in Figure 11 is integral with a blade shaft 104 rotatably supported (by means of a bearing capable of acting as a thrust bearing) in rim 106 of a hub structure 107 integral with propeller shaft 108. Shaft 104 is also guided within a blade base piece 110 rotatably supported in rim 105 and having an outer surface which blends with hub shielding 100 and preferably conforms to a sphere having the intersection of the axis of shafts 104 and 108 as its center. The portion of each blade intermediate between base piece 110 and tip 103 comprises a hollow and relatively flexible shell 111 integrally joined to a base socket piece 112 and a tip socket piece 113. These socket pieces are designed to respectively fit over tenon 114 of tip 103 and tenon 115 of base piece 110, each of which tenons accurately fits its mating socket and is of such shape as to prevent the tenon from rotating within the socket. The shell 111 may, for instance, be made of molded plastic, with socket pieces 112 and 113 constituting metal inserts molded integrally into the plastic piece. Alternatively shell 111 may be of thin flexible metal welded to the two socket pieces.

As in the case of the rotor blade previously described, arrangements are provided for rotating the base of the blade through an angle proportional to, but much greater than, the angle through which the tip is rotated, the difference in the two amounts of rotation being taken up in twist of shell 111, which serves to effect a gradual transition between the pitch setting of the base and that of the tip according to a pattern dependent upon the stiffness pattern of the shell.

The construction of the propeller hub and the mechanism for controlling and altering blade pitch will now be described in detail. Propeller shaft 108 is supported in a bearing 117 mounted in frame member 118 of the craft. Bearing 117 terminates forwardly in a gear 120 integral with the bearing. Integrally attached to rim 105 of hub member 107 is an internal gear 121 concentric with shaft 108. Pivotally mounted on the central hub 123 of hub member 107 is spider 124 including one or more arms 125, each carrying a stud 126 on which are mounted two similar but independently rotatable planetary pinions 127 and 128. Planetary pinion 127 meshes inwardly with gear 120, which therefore serves as the sun gear of a planetary system, and which as previously described is integral with the framework of the craft. This same planetary pinion 127 meshes outwardly with internal gear 121, which as previously described is integral with propeller hub member 107 and shaft 108. Hence planetary pinion 127 will serve to definitely position stud 126 at all times, causing it to revolve about shaft 108 at a fixed fraction of the speed of revolution of the shaft.

Rotatably mounted on the central sleeve portion of bearing 117 is a compound gear including at one end thereof gear portion 130, identical in size and pitch with gear 120, and at the other end a gear portion 131, which may be of any convenient diameter. Gear 130 acts as a sun gear for planetary pinion 128, just as gear 120 does for pinion 127. Rotatably mounted on compound gear 130, 131 is a hub 132 carrying a disc 133 integrally supporting a ring 134 the internal surface of which constitutes an internal gear of the same size and pitch as internal gear 121 previously described. The external surface of ring 134 constitutes a spur gear meshing with three pinions 135 (one for each blade). Each pinion 135 is integral with a shaft 136 and a worm 137 meshing with a worm gear 138 which in turn is integral with the blade shaft 104 previously described. Therefore any rotation of a gear 135, in one direction or the other relative to the propeller hub, will proportionately increase or decrease the pitch of the corresponding propeller tip 103.

Each pinion 135 is connected through idler 140 to a pinion 141 integral with shaft 142 and worm 143, which in turn meshes with worm gear 144 integral with base piece 110 of the related blade. Worm 143 is of so much steeper pitch than worm 137 as to turn base piece 110 at the desired multiple of the amount that tip 103 is turned. As in the case of the rotor blade the desired ratio of movement of tip 103 and base piece 110 can be obtained in spite of torsional deflection of shaft 104, by establishing the worm gear ratios in the proportion to each other indicated by Equations 4 and 6. Also the worm 137 and worm gear 138 may be dispensed with if the relative torsional stiffness of shaft 104 and shell 111 satisfy Equations 5 or 7.

The pitch of the blades is controlled from the craft in accordance with the rotational setting of shaft 150, which extends out from the craft into the vicinity of the propeller and terminates in a gear 151 meshing with the gear 131, previously described. As long as shaft 150 remains stationary, gear 151 prevents rotation of compound gear 131, 130. As long as gear 130 is held stationary ring gear 134 will be revolved by planetary pinion 128 at exactly the same speed as the propeller, since in the parallel planetary unit which determines the movement of stud 126 sun gear 120 is always stationary and internal gear 121 always turning at the same speed as the propeller. With ring gear 134 thus fixed relative to the propeller hub, gears 135 and 141 will remain fixed relative thereto, and the pitch of the blades will remain constant. However, if shaft 150 is rotated in one direction or the other gear 130 will be correspondingly rotated, thus imparting an increment of rotation to planetary pinion 128 which will advance or retard ring gear 134 relative to the propeller hub, which movement will rotate all gears 135 and 141 equally and impart an equal increase or decrease in pitch to all propeller blades, but within each blade the amount of pitch change will gradually increase toward the root in accordance with a pattern prearranged to permit each element of the blade to be set at the pitch angle bearing the best relation to the pitch angles of the other portions of the blade. This pattern may preferably correspond substantially to that represented by curves 68, 62, and 86 of Figure 7 applying to axial flow conditions of the sustaining rotor, as previously described.

My copending application, Serial Number 488,917, filed May 28, 1943 discloses how, by surrounding a propeller by a properly shaped duct, the static pressures developed by the propeller may be greatly increased, and the range of pitch angles that can be advantageously employed may be considerably increased, thus rendering propellers effective at unprecedented speeds and altitudes. However, if rigid blades are employed instead of flexible blades with adjustable blade twist in accordance with the present invention, the sacrifices in efficiency and performance encountered by the necessity of employing unsuitable pitch angles on some portions of the blades are particularly large because the static pressures handled are so large that inequalities therein may have serious effect. The unusual advantages of the ducted propeller can therefore only be realized in anything approximating their full potential measure, by utilizing in the ducted propeller, blades of adjustable twist together with means for properly controlling and adjusting the twist during operation. The application of the present invention to the ducted propeller therefore constitutes a most important possible field for its use and one making possible the attaining of results which would not be possible except through combining in a single propulsion unit the properly shaped duct and propeller blades having twist adjustable in accordance with the proper pattern of pitch distribution. As set forth in my above mentioned copending application Serial Number 488,917 the duct, in order to operate to the best advantage is preferably one proportioned in accordance with the formula:

$$i = e + \frac{20,000 H^{1/3} a^{1/3} D^{2/3} S^{4/3} e^2}{V^2 a^{2/3} D^{4/3} S^{2/3} e + 8 V H^{2/3}}$$

in which:

$i$=the ratio of the net area of duct inlet to the gross disc area swept by the airscrew,
$e$=the ratio of the net area of duct outlet to the gross disc area swept by the airscrew,
$H$=horsepower to be delivered to airscrew under the specific or average conditions selected as those at which it is desired maximum operating efficiency shall occur,
$V$=craft velocity in miles per hour under these same conditions,
$a$=density ratio at altitude for these same conditions; that is, ratio of standard air density at the specific or average altitude selected as that at which it is desired maximum operating efficiency shall occur to standard air density at sea level,
$D$=diameter of airscrew, in feet,
$S$=solidity ratio of net airscrew area; that is the ratio that the area of the projection of the airscrew onto a plane perpendicular to the airscrew axis minus the hub area which constitutes that portion of the swept disc area not available for airflow bears to the gross swept disc area of the airscrew minus the same hub area.

A propeller constructed in accordance with the present invention, when placed within a duct proportioned in accordance with the foregoing formula, will make it possible to attain unprecedented increases in thrust values at high efficiencies, for such a result is contingent upon developing static pressures which can only be maintained if all parts of the blades are capable of developing pressure in a fairly equitable degree, to do which over any large range of blade pitch settings requires a construction such as contemplated by my present invention, and requires that the propeller be surrounded by a duct to preserve the pressure, and that the duct be so shaped as to permit of the efficient conversion of the pressure into thrust under the actual flight conditions which will be true if the duct shape substantially accords with the above formula.

Figure 13 illustrates such an embodiment, in which the propeller has a hub covering 100' and blades comprising tips 103', socket pieces 112' and 113', flexible shells 111', and base pieces 110', all substantially corresponding to the respective parts 100, 103, 112, 113, 111, and 110, of Figures 10, 11, and 12. The propeller of Figure 13 also comprises the mechanism illustrated in Figure 11 and described above for adjusting blade pitch. This propeller is placed within a duct 160, preferably constructed in accordance with the disclosure of my copending application Serial Number 488,917, and supported from a fixed portion of the craft by means of vanes 161 which serve also as straightening vanes to neutralize the rotational components of the slip stream.

I claim:

1. In an airscrew having a rotatable hub, the combination of one or more flexible blades; the root of each blade being adjustably attached to said hub for angular adjustment about an axis extending outwardly from said hub; and the width of each blade varying in substantially inverse proportion to the radius from the center of the airscrew, means for effecting angular adjustment about the blade axis of a section of each blade adjacent the root thereof, and means for preventing equal angular displacement about said blade axis of a section of said blade outwardly spaced from the root thereof.

2. In an airscrew having a rotatable hub, the combination of one or more blades; the root of each blade being adjustably attached to said hub for angular adjustment about an axis extending outwardly from said hub; the width of each blade varying in substantially inverse proportion to the radius from the center of the airscrew; and each of said blades having a flexible portion, means for effecting angular displacement about the blade axis of a section of each of said flexible portions nearest the blade root, and means for preventing equal angular displacement about the blade axis of a section of each of said flexible portions remote from the blade root; the effective polar moment of inertia of the flexible portion of each of said blades varying throughout its length substantially in proportion to the square of the distance from hub center.

3. In an airscrew having a rotatable hub, the combination of one or more flexible blades, the root of each blade being adjustably attached to said hub for angular adjustment about an axis extending outwardly from said hub; and the width of each blade varying in substantially inverse proportion to the radius from the center of the airscrew, means for effecting angular adjustment about the blade axis of a section of each blade adjacent the root thereof, and separate means for effecting angular displacement about said blade axis of a section of said blade radially spaced from the root thereof.

4. In an airscrew having a rotatable hub, the combination of one or more blades; the root of each blade being adjustably attached to said hub for angular adjustment about an axis extending outwardly from said hub; the width of each blade varying in substantially inverse proportion to the radius from the center of the airscrew; and each of said blades having a flexible portion, means for effecting angular displacement about the blade axis of a section of each of said flexible portions nearest the blade root, and separate means for effecting angular displacement about said blade axis of a section of each of said flexible portions remote from the blade root.

5. In an airscrew having a rotatable hub and a blade of length R measured from hub center the root of which blade is adjustably attached to said hub for angular adjustment about a blade axis extending outwardly therefrom; the combination of means for effecting angular displacement about the blade axis of a cross-section of the blade adjacent the root thereof and located at the distance $r_2$ from the center of the hub, and means for preventing equal angular displacement of a cross-section of the blade remote from the hub and located at the distance $r_1$ from the center of the hub, said last mentioned means comprising a member connecting said hub to said blade in the vicinity of said last mentioned cross-section thereof, the torsional stiffness of the portion of the blade lying between said two cross-sections being substantially $$\left(\frac{r_1+R}{2r_2}-1\right)$$

times as great as that of said member.

6. In an airscrew having a rotatable hub and a blade attached thereto and extending outwardly a distance R from the center of the hub; the combination of means for effecting angular displacement about the longitudinal blade axis of a cross-section of the blade adjacent the root thereof and located at the distance $r_2$ from the center of the hub, means for effecting a different angular displacement about said blade axis of a cross-section of said blade remote from the root thereof and located at the distance $r_1$ from the center of the hub, said latter means comprising an angularly displaceable member having a torsional stiffness $1/f$, as great as that of the portion of the blade intermediate between said two cross-sections, said member extending longitudinally of the blade from the vicinity of said first mentioned cross-section to the vicinity of said second mentioned cross-section, and mechanism connecting said blade in the vicinity of said first mentioned cross-section to an adjacent portion of said member to maintain the angular displacement of said portion of said member proportional to the angular displacement of said cross-section of said blade substantially in the ratio:

$$\frac{2r_2}{r_1+R}(f+1)-f$$

7. In an airscrew having a rotatable hub, and a blade having a flexible portion and a blade root which is adjustably attached to said hub for angular adjustment about a blade axis extending outwardly from said hub; the combination of means for effecting angular displacement about the blade axis of a cross-section of the blade adjacent the root thereof, and means for preventing equal angular displacement of a cross-section of the blade remote from the hub; the effective polar moment of inertia of the flexible portion of the blade varying throughout its length substantially in proportion to the square of the distance from hub center.

8. In an airscrew having a rotatable hub, and a blade connected thereto and including an outer aerodynamic shell; the combination of means for changing the pitch of a first cross-section of said blade at a position remote from the hub in response to flapping displacement of the blade relative to the hub, said means comprising a member of appreciable torsional stiffness integrally attached to said shell in the vicinity of said cross-section and hingedly attached to said hub by means of a flapping hinge making an acute angle with the longitudinal axis of the blade, and means for changing the pitch of a second cross-section of said blade at a position closer to the hub than said first cross-section in response to the same flapping displacement of the blade, said last mentioned means comprising a pitch changing hinge pivotally attaching said shell in the vicinity of said second cross-section to said member so that said member will vertically displace a portion of said shell at said second cross-section whenever said member is angularly displaced upon said flapping hinge, and means for restraining vertical movement of a portion of said shell in the vicinity of said second cross-section.

9. An airscrew of the character set forth in claim 8 wherein the restraining means comprises a member adjustably attached to the shell of the blade.

10. In an airscrew having a rotatable hub and a blade attached thereto; means for cyclically varying the pattern of pitch distribution along the blade, comprising means responsive to non-axial components of airflow for causing cyclic pitch changes in a first portion of the blade, a tiltable swash plate, means connecting a second portion of the blade to the swash plate for causing cyclic pitch changes in said second portion of the blade different from those in the first portion thereof, and a torsionally flexible aerodynamic shell connecting said first portion and said second portion.

HAROLD T. AVERY.

REFERENCES CITED

The following references are of record in the file of this patent:

UNITED STATES PATENTS

| Number | Name | Date |
|---|---|---|
| 1,526,230 | Pescara | Feb. 10, 1925 |
| 1,611,717 | Bushyager | Dec. 21, 1926 |
| 1,963,531 | Roberts | June 19, 1934 |
| 1,986,709 | Breguet | Jan. 1, 1935 |
| 2,030,578 | Flettner | Feb. 11, 1936 |
| 2,213,497 | Kelly | Sept. 3, 1940 |
| 2,297,226 | Muller-Kenth et al. | Sept. 29, 1942 |
| 2,298,576 | McElroy et al. | Oct. 13, 1942 |

FOREIGN PATENTS

| Number | Country | Date |
|---|---|---|
| 272,578 | Great Britain | June 9, 1927 |
| 541,320 | France | July 26, 1922 |
| 851,766 | France | Jan. 15, 1940 |